United States Patent [19]

Snyder et al.

[11] 3,942,910

[45] Mar. 9, 1976

[54] GRIP-YOKE ASSEMBLY WITH A REDUNDANT CENTRIFUGAL LOAD SUPPORT

[75] Inventors: David E. Snyder, Arlington; Cecil E. Covington, Hurst, both of Tex.

[73] Assignee: Textron, Inc., Providence, R.I.

[22] Filed: May 13, 1974

[21] Appl. No.: 469,530

[52] U.S. Cl. .............................. 416/141; 416/135
[51] Int. Cl.² ........................................ B64C 27/48
[58] Field of Search ........... 416/134, 135, 138, 140, 416/141, 136, 139

[56] References Cited
UNITED STATES PATENTS

| | | | |
|---|---|---|---|
| 3,111,172 | 11/1963 | Gorndt et al. | 416/141 X |
| 3,280,918 | 10/1966 | Drees et al. | 416/135 X |
| 3,292,712 | 12/1966 | Schmidt | 416/141 |
| 3,556,673 | 1/1971 | Killian | 416/141 X |
| 3,695,779 | 10/1972 | Kastan et al. | 416/141 X |
| 3,700,352 | 10/1972 | Gorndt | 416/141 X |
| 3,761,199 | 9/1973 | Ferris et al. | 415/134 |
| 3,790,302 | 2/1974 | Pascher | 416/134 |
| 3,807,896 | 4/1974 | Johnson | 416/134 X |

*Primary Examiner*—Everette A. Powell, Jr.
*Attorney, Agent, or Firm*—Richards, Harris and Medlock

[57] ABSTRACT

A grip-yoke assembly for attaching a helicopter blade to the mast of the helicopter rotor having a conventional primary coupling to carry the centrifugal loads and a redundant path operative should the primary coupling fail to insure continued operability of the blade. In one embodiment, the redundant load path has a bearing surface formed on the inboard end of the grip and a corresponding thrust bearing mounted on an inboard yoke fitting for engagement with the bearing surface upon failure of the coupling. In an alternative embodiment, a bearing surface is formed on an outboard grip fitting and a corresponding thrust bearing is supported on the yoke outboard of the grip fitting.

22 Claims, 6 Drawing Figures

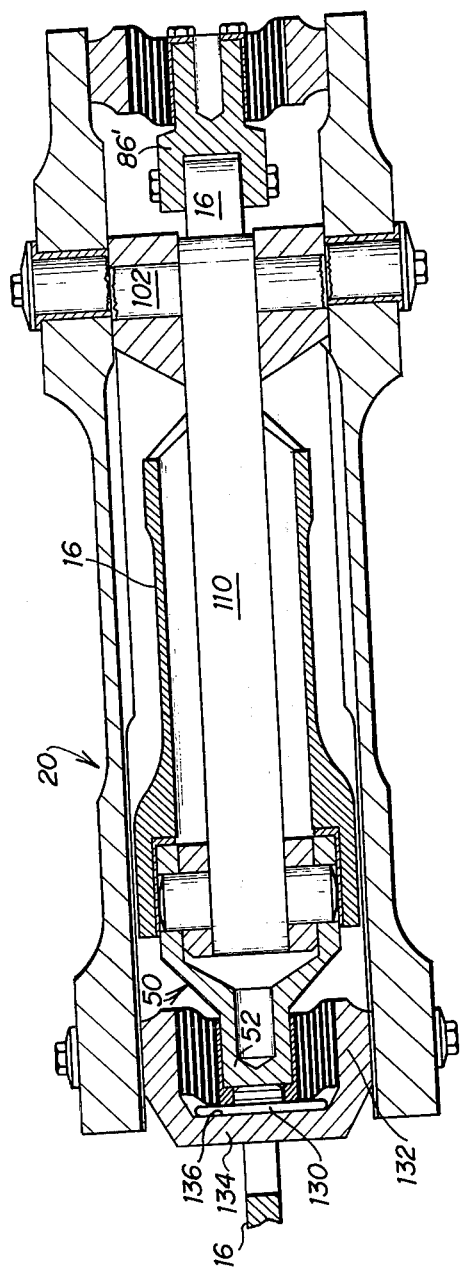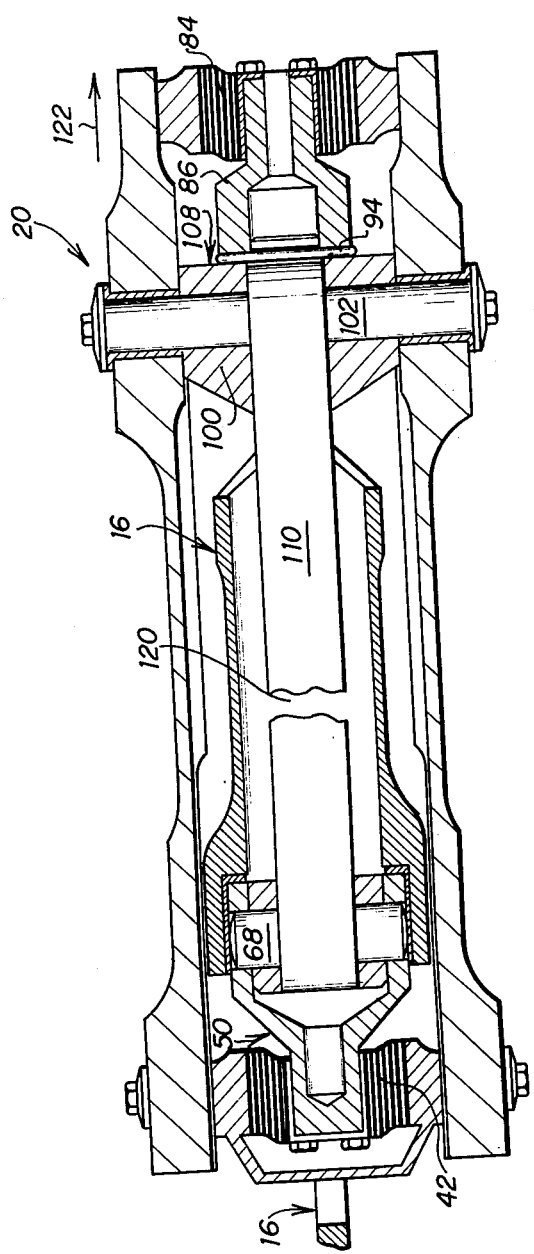

3,942,910

GRIP-YOKE ASSEMBLY WITH A REDUNDANT CENTRIFUGAL LOAD SUPPORT

BACKGROUND OF THE INVENTION

The present invention relates to mounting structures for the rotor blades of a rotary wing aircraft and more particularly to a coupling system providing pitch adjustments of the blade and providing a redundant load path effective upon failure of the primary centrifugal load path.

It is conventional to attach the main rotor blades of a rotary wing aircraft to the mast by means of grip-yoke assemblies. These grip-yoke assemblies have elastomeric bearings for allowing relative rotational movement between the grip and yoke members while maintaining axial alignment between these members. Such assemblies utilize conventional tension strap and fittings or elastomeric thrust pads to transfer the centrifugal loads between the members. Since centrifugal blade loads are quite high, and since the main rotor blades provide essential lift forces for rotary wing aircraft, failure in the centrifugal load carrying system can create disastrous results.

The present invention is directed to an improved centrifugal load carrying system which provides a redundant centrifugal load path to allow continued operation of the aircraft if the primary centrifugal load carrying system fails.

More particularly, in the invention, a redundant centrifugal load structure is provided with a yoke structure connected to the hub of the rotor and a grip attached to the blade. The grip encloses the yoke and is held in radial alignment therewith by elastomeric radial bearings. A conventional tension strap or elastomeric thrust pad is attached between an inboard strap fitting on the inboard end of the yoke and an outboard strap fitting on the grip. A thrust bearing is mounted on the inboard end of the yoke and a transverse member with a corresponding bearing surface is provided on the grip inboard of the thrust bearing for engagement therewith upon failure of the primary thrust support system. In another embodiment, a bearing surface is formed on the outboard side of the outboard strap fitting and a thrust bearing is attached to the yoke outboard of the outboard strap fitting for contact upon failure of the primary centrifugal load carrying system.

The objectives and advantages of the present invention will be set forth in detail in the following description of the preferred embodiments of the invention with reference to the accompanying Drawings in which:

BRIEF DESCRIPTION OF THE DRAWINGS

FIG. 4 is a section similar to FIG. 3 illustrating the redundant support structure in operation; and FIGS. 5 and 6 are sections similar to FIG. 3 illustrating alternative embodiments.

DESCRIPTION OF THE PREFERRED EMBODIMENTS

Figure 1:
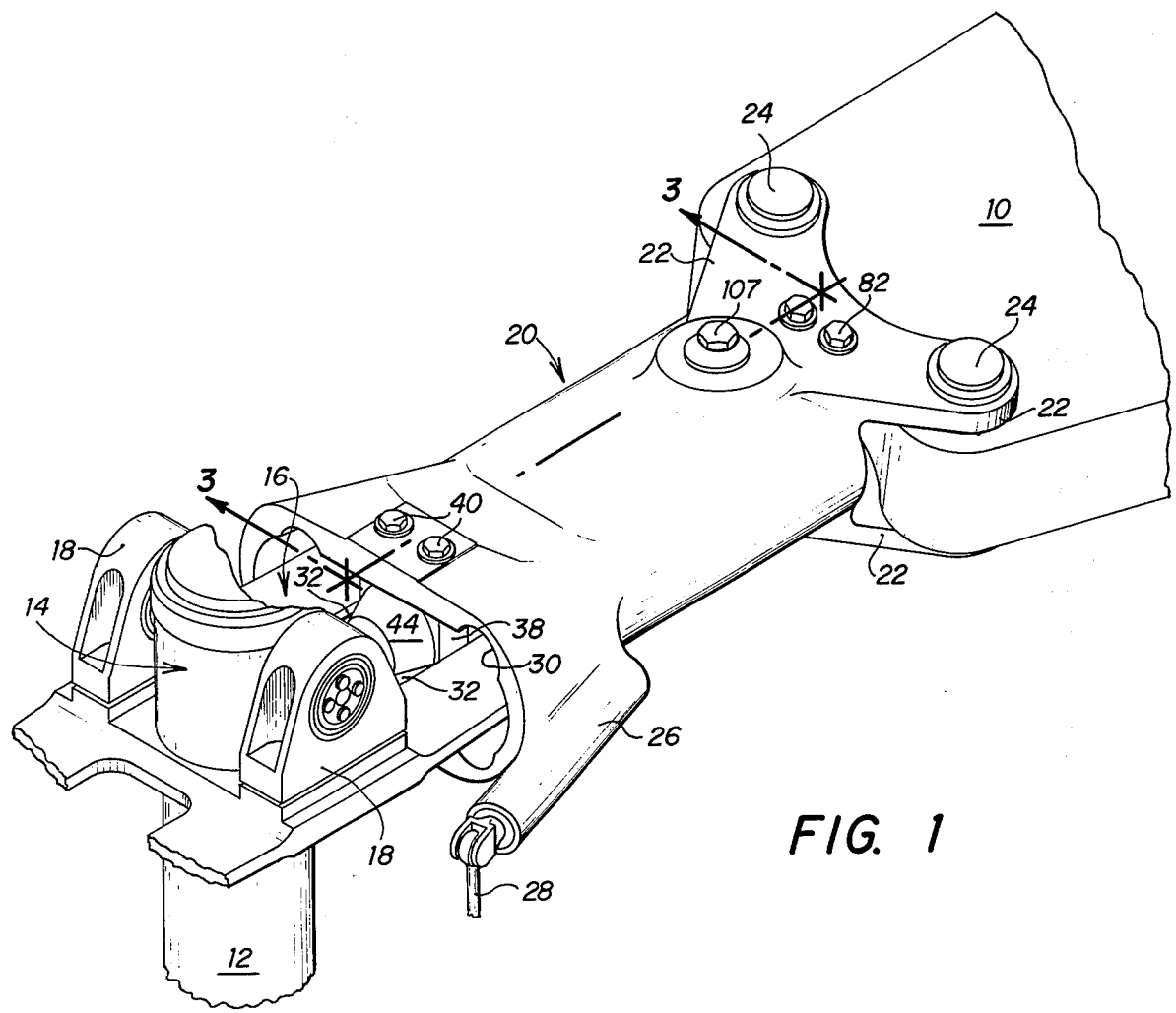
FIG. 1 is a top perspective view illustrating the rotor, grip-yoke assembly and blade of a helicopter.
Figure 3:
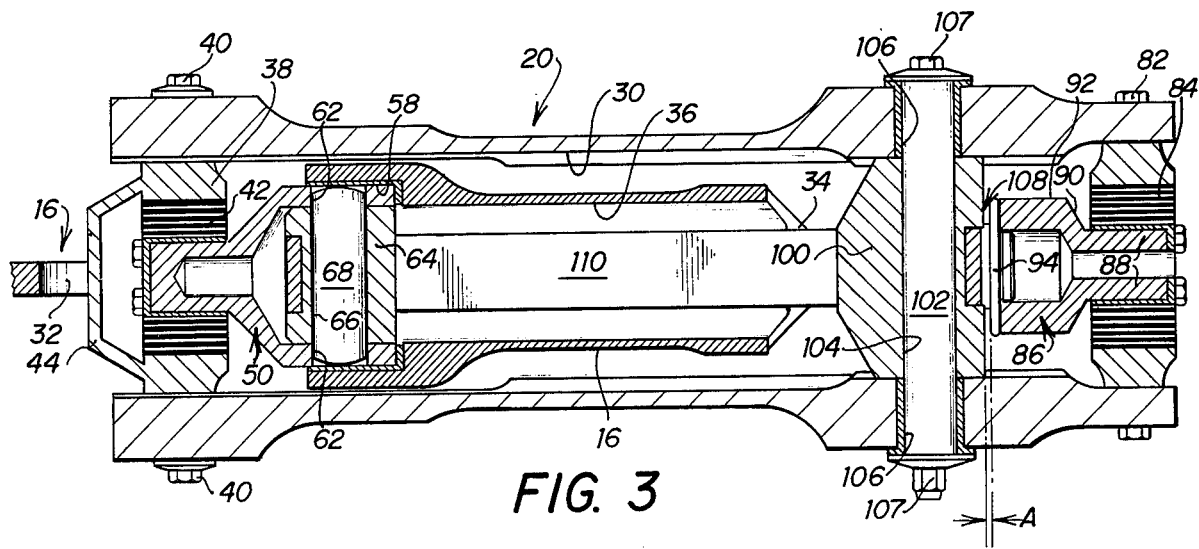
FIG. 3 is a vertical section of the device taken along lines 3—3 of FIG. 1, looking in the direction of the arrows.

Referring now to the Drawings wherein like reference characters designate like or corresponding parts throughout the several views, there is illustrated in FIG. 1 a grip-yoke assembly for mounting a main rotor blade 10 to the main rotor mast 12 of the helicopter aircraft. A hub 14 mounted on the upper end of mast 12 is connected to a yoke 16 by means of bearing mountings 18. Yoke 16 extends to either side of main rotor mast 12. Each side of yoke 16 is rotatably attached to a grip member 20.

Grip member 20 is provided with four tangs 22. Bolts 24 are used to attach the inboard end of blade 10 to tangs 22. A pitch horn 26 extends from the trailing side of grip 20 and is attached to a control tube 28 for controlling the pitch of blade 10.

Figure 2:
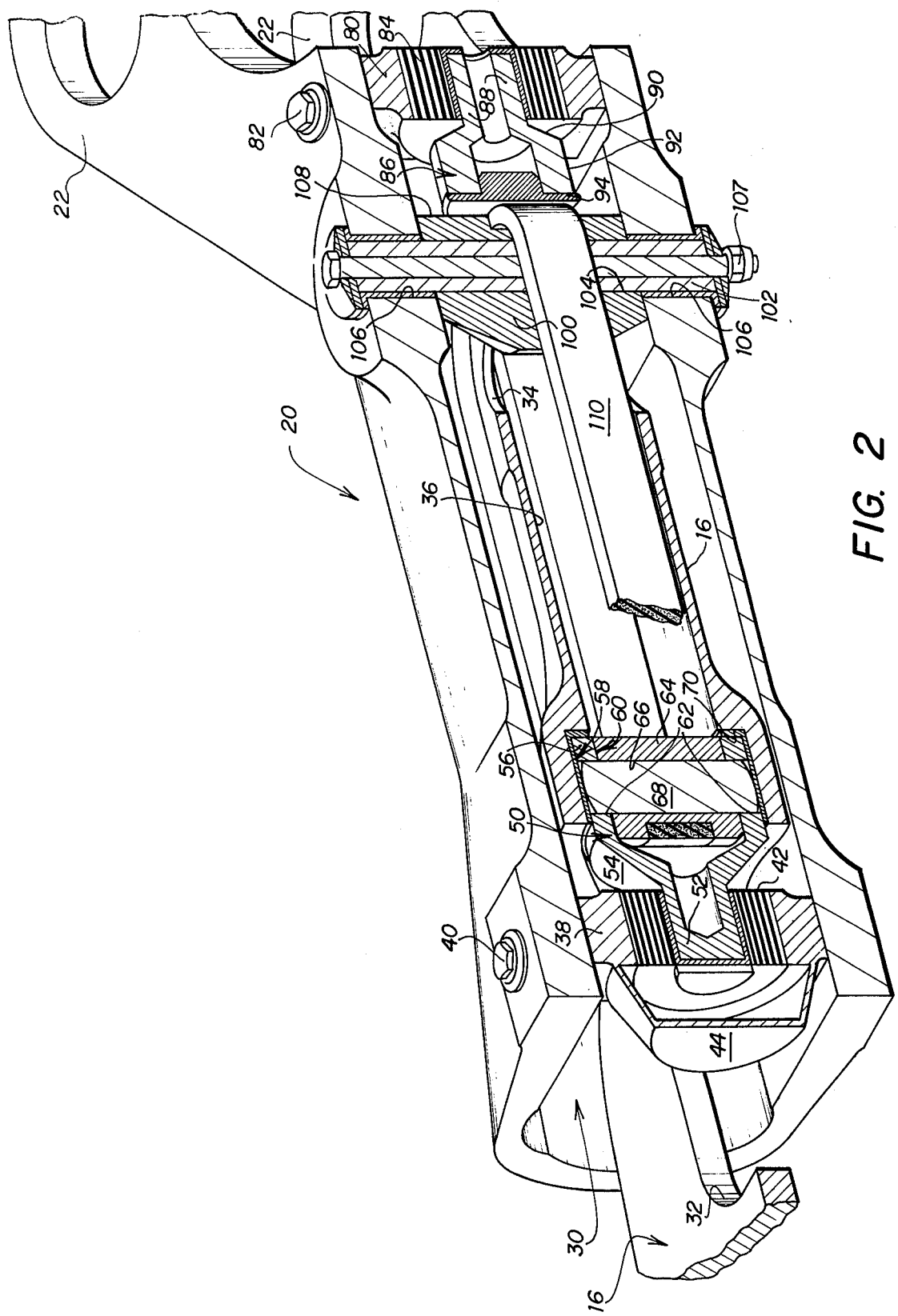
FIG. 2 is an enlarged perspective view partially in vertical section.

FIG. 2 illustrates in detail the primary centrifugal load supporting system interconnecting yoke 16 and grip 20 to allow pitch rotation of blade 10. Grip 20 is provided with a longitudinally extending chamber 30 in which is mounted yoke 16. Yoke 16 has inboard and outboard clearance openings 32 and 34, respectively, extending completely therethrough. An axially extending chamber 36 is formed in the yoke 16 between openings 32 and 34. Chamber 36 forms a covering for the strap assembly of the primary centrifugal load supporting system.

An inboard bearing fitting 38 is fixed to grip 20 at the inboard end thereof. Fitting 38 extends through opening 32 and across the inboard ends of chambers 30 and 36. Fitting 38 is fixed in place by bolts 40 on grip 20. Fitting 38 is bonded to the exterior cylindrical surface of an elastomeric bearing 42. Bearing 42 is a conventional elastomeric bearing formed from alternating concentric cylindrical members of elastomer and metallic materials bonded together. Fitting 38 has dust seal cap 44 to protect bearing 42.

Inboard strap fitting 50 has a cylindrical portion 52 bonded to the interior cylindrical surface of elastomeric bearing 42. Strap fitting 50 has a conical portion 54 extending between portion 52 and a large cylindrical portion 56. Portion 56 of fitting 50 is of a size to fit into an annular groove 58 formed at the inboard end of chamber 36.

A chamber 60 is formed in the interior of cylindrical portion 56. Radially extending aligned bores 62 extend through portion 56. A cylindrical inboard strap spool 64 is of a size to fit into chamber 60. A central bore 66 extends through the spool 64 for alignment with bores 62. An inboard strap pin 68 is inserted through bores 62 and 66 to fix spool 64 in place within chamber 60.

Groove 58 has a shoulder 70 against which fitting 50 rests when the primary load carrying system is loaded. In this manner, fitting 50 is attached at one end to yoke 16 and has its other end supported by bearing 42. Bearing 42 is in turn attached to grip 20 to maintain axial alignment between the grip and yoke. Limited rotation between grip 20 and yoke 16 for blade pitch adjustments is provided by distortion of bearing 42.

A similar bearing structure is positioned at the outboard end of chamber 30. An outboard bearing support fitting 80 is attached to grip 20 to extend across the outboard ends of chambers 30 and 36. Fasteners 82 extend through grip 20 and fix fitting 80 in place. An elastomeric bearing 84 similar in construction to bearing 42 has its exterior cylindrical surface bonded to fitting 80.

According to one aspect of the present invention, an improved radial bearing support and combined redundant load path member 86 is supported from and attached to the outboard end of yoke 16. Member 86 has flanges (not shown) bolted to yoke 16 at points outboard of opening 34. Member 86 has a cylindrical portion 88 which extends in an outboard direction and is bonded to the interior of bearing 84. A conical portion 90 connects portion 88 to an enlarged cylindrical portion 92. Enlarged cylindrical portion 92 extends in an inboard direction and uniquely has a thrust bearing 94 mounted on the inboard side thereof.

An outboard strap spool 100 is positioned to extend transversely across the interior of chamber 30 to extend through opening 34. Spool 100 is fixed in position in the chamber by means of an outboard strap pin 102. Pin 102 extends through a bore 104 in spool 100 and through aligned bores 106 in the walls of grip 20. Pin 102 is fixed in position by fastener 107 in the ends thereof. Spool 100 has a planar outboard facing surface 108 which is spaced a short distance "A" from the inboard side of bearing 94.

A tension strap 110 extends through chamber 36. Strap 110 is connected between inboard strap spool 64 and outboard strap fitting 100 to provide a primary centrifugal load path between the grip and yoke. Strap 110 is of a conventional construction and can be twisted along its length to allow pitch adjustment of helicopter blade 10. In addition, elastomeric bearings 84 and 42 maintain radial alignment between the grip and yoke.

Conventionally upon failure of tension strap 110 or its mounting, grip 20 will translate with respect to yoke 16 to a point where either blade 10 falls completely off the mast or pitch control is lost. Either one of these results can cause the aircraft to crash.

In the present invention a unique secondary or redundant load path is provided which is effective in the event of a failure of the primary load carrying system. This redundant load path is effective in the event, for example, strap 110 breaks at 120, as illustrated in FIG. 4. Break 120 frees grip 20 to move in the direction of arrow 122 with respect to yoke 16. This in turn causes bearings 84 and 42 to deform, as illustrated, and moves bearing 94 a distance A into contact with surface 108 of outboard strap spool 100. Since bearing 94 is supported by member 86 which is in turn connected to yoke 16, relative movement of grip 20 with respect to yoke 16 will be limited to the dimension A. In addition, the engagement of bearing 94 on surface 108 will allow pitch adjustments of blade 10. This allows blade 10 to continue to operate for a short period of time to allow safe landing of the aircraft.

In addition, this redundant system operates upon failure of members such as the pin 68 or fitting 50.

In this manner, a redundant centrifugal load supporting system is provided which allows pitch adjustments of the blade and which presents aircraft crash upon failure of the primary system.

In FIG. 5, a second embodiment of a redundant centrifugal load path is illustrated. In this embodiment thrust bearing 94 is not present on outboard member 86'. However, a bearing 130 is mounted on the inboard end of portion 52 of fitting 50. An inboard radial support fitting 132 is provided with an end cap 134 which extends transversely across grip 20. Cap 134 encloses bearing 130 and has a planar surface 136 which is normally spaced away from bearing 130 a short distance. Cap 134 is designed to carry axial loads upon failure of the primary system. Upon failure of either strap 110, fitting 100, or pin 102, bearing 130 will move into contact with surface 136 and will provide for pitch adjustment of the blade.

Figure 6:
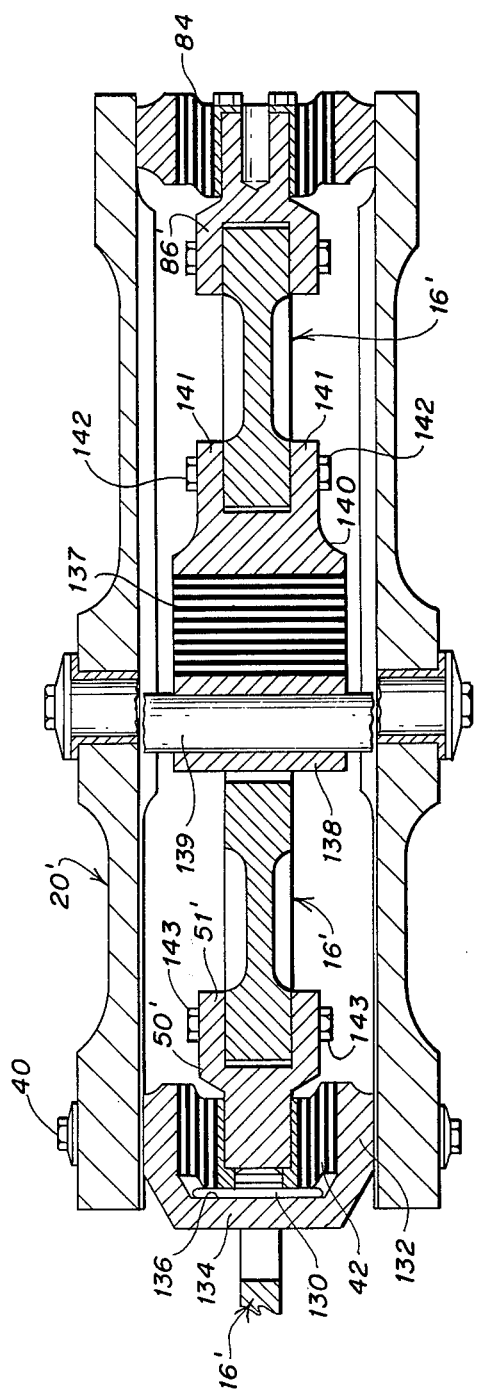

A third embodiment of a redundant centrifugal load path is illustrated in FIG. 6, where instead of a tension strap the primary load supporting system includes an elastomeric thrust pad 137 of construction similar to bearings 42 and 84. Pad 137 is laterally supported on the inboard side by fitting 138 fixed to pin 139 on grip 20'. The outboard side of pad 137 is laterally supported by a fitting 140 with flanges 141 fixed in place by bolts 142 extending through yoke 16'. In addition, the redundant load path includes inboard fitting 50' with outboard flanges 51' fixed to yoke 16' by means of bolts 143. Upon failure of either thrust pad 137 or pin 139, bearing 130 will move into contact with surface 136 is described in the embodiment illustrated in FIG. 5.

Although three embodiments of the secondary load path have been illustrated, it is to be understood, of course, that other configurations could be utilized to provide a secondary load path which is effective upon failure of the primary load path without departing from the spirit and scope of the invention. These other configurations could involve other types of friction reducing elements other than thrust bearings positioned to selectively engage a transverse member upon failure of the primary system.

Having described the invention in connection with certain specific embodiments thereof, it is to be understood that further modifications may now suggest themselves to those skilled in the art and it is intended to cover such modifications as fall within the scope of the appended claims.

We claim:

1. A redundant coupling for attaching a helicopter rotor blade to a mast mounted yoke where a grip encompasses said yoke and is rotatably attached thereto by a primary coupling to allow blade pitch change while opposing centrifugal forces from said blade, comprising:
   a transverse member mounted on said grip;
   a restraint member on said yoke; and
   a thrust bearing normally free from stress supported between said restraint member and said transverse member and adapted to carry said centrifugal forces upon failure of said primary coupling to permit outward displacement of said grip to stress said thrust bearing thereby restraining said blade while maintaining pitch change capability of said blade.

2. The coupling of claim 1 additionally comprising elastomeric bearings attached between said grip and yoke for maintaining radial alignment therebetween.

3. The coupling of claim 1 wherein said transverse member is mounted on said grip at an inboard location.

4. The coupling of claim 3 wherein said transverse member comprises a load carrying dust cap on said grip.

5. The coupling of claim 3 wherein said restraint member comprises an inboard fitting on said yoke. and yoke, 6. The coupling of claim 1 wherein said transverse member is mounted on said grip at an outboard location.

7. The coupling of claim 6 wherein said transverse member comprises an outboard fitting on said grip.

8. The coupling of claim 6 wherein said restraint member is a radial bearing support member on said yoke.

9. The coupling of claim 1 wherein said primary coupling is a tension strap.

10. The coupling of claim 1 wherein said primary coupling is an elastomeric thrust pad.

11. In combination, means for connecting a main helicopter blade to the rotor having a yoke connected to the rotor, a grip enclosing the yoke and connected to the blade, a strap assembly connecting the grip and yoke.

the improvement which comprises a transverse member on said grip, a portion of said yoke outboard of said transverse member normally free of centrifugal forces on said grip for contacting said transverse member and retaining said yoke in said grip upon failure of said strap.

12. The combination of claim 11 additionally comprising a thrust bearing mounted on said portion of said yoke.

13. A coupling for attaching a helicopter rotor blade to a mast comprising:
a yoke attached to and extending from said mast;
a grip enclosing said yoke and attached to said blade;
bearing means interconnecting said grip and yoke to maintain relative axial alignment and permit limited radial rotation therebetween;
a primary load supporting means connecting said yoke and grip for transferring centrifugal loads from said grip to said yoke and for allowing limited radial rotation therebetween; and
redundant load supporting means on said grip and yoke normally free from said loads for transferring said loads from said grip to said yoke upon outward displacement of said grip due to failure of said primary load supporting means.

14. The coupling of claim 13 wherein said primary load supporting means is a tension strap.

15. The coupling of claim 13 wherein said primary load supporting means is an elastomeric thrust pad.

16. The coupling of claim 13 wherein said secondary load supporting means comprises a thrust bearing mounted on said yoke, and a transverse member on said grip positioned inboard of said bearing for contact with said bearing upon failure of said primary load supporting means.

17. The coupling of claim 13 wherein said bearing means comprises elastomeric bearings attached between said yoke and grip.

18. In a coupling for attaching a helicopter rotor blade to a mast comprising in combination:
a yoke attached to and extending from said mast;
a grip enclosing said yoke and attached to said blade;
bearing means interconnnecting said grip and yoke to maintain relative axial alignment and permit limited radial rotation;
a primary load supporting means connecting said yoke and grip for transferring centrifugal loads from said grip to said yoke and for allowing limited radial rotation therebetween; and
the improvement which comprises a redundant load supporting means on said grip and yoke normally free of said loads and positioned to transfer centrifugal loads from said grip to said yoke upon failure of said primary load supporting means and radial displacement of said blade relative to said yoke.

19. The coupling of claim 18 wherein said primary load supporting means is a tension strap.

20. The coupling of claim 18 wherein said primary load supporting means is an elastomeric thrust pad.

21. The coupling of claim 18 wherein said secondary load supporting means comprises a thrust bearing mounted on said yoke, and a transverse member on said grip positioned inboard of said bearing for contact with said bearing upon failure of said primary load supporting means.

22. The coupling of claim 18 wherein said bearing means comprises elastomeric bearings attached between said yoke and grip.

* * * * *